April 2, 1968    R. V. MATHISON    3,375,725
ROTATABLE CYLINDER AND PULLEY DEVICES
Filed Nov. 22, 1965    2 Sheets-Sheet 1
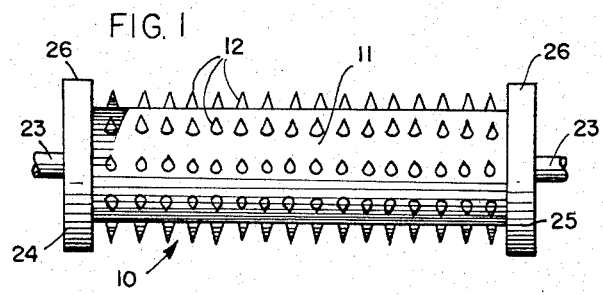
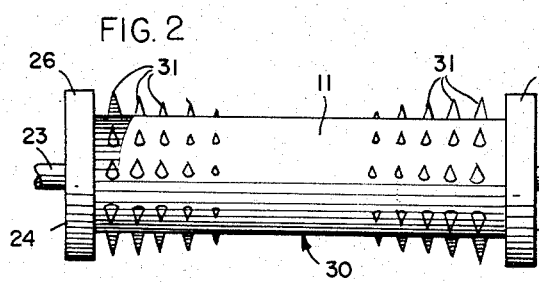
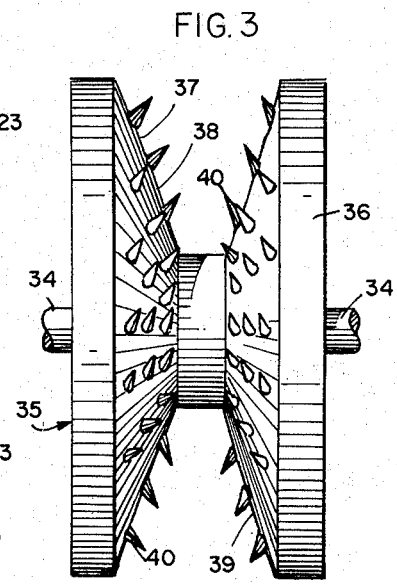
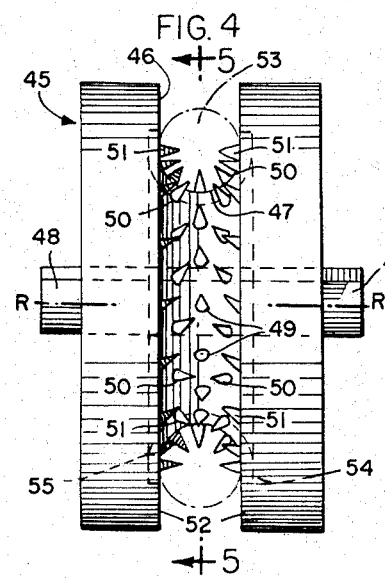
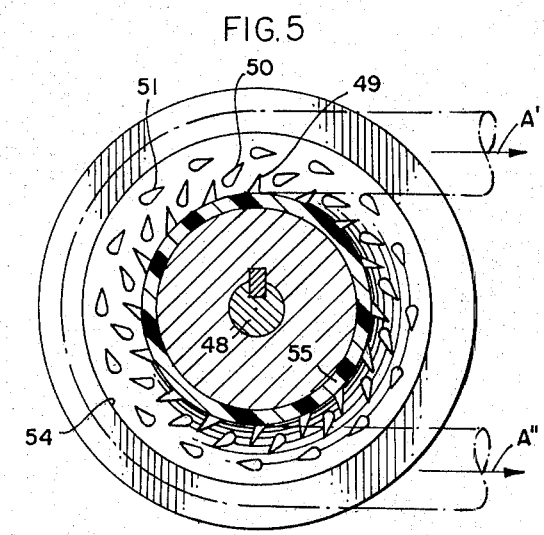
INVENTOR:
ROBERT V. MATHISON
BY
Marzall, Johnston, Cook & Root
ATT'YS April 2, 1968  R. V. MATHISON  3,375,725
ROTATABLE CYLINDER AND PULLEY DEVICES
Filed Nov. 22, 1965  2 Sheets-Sheet 2
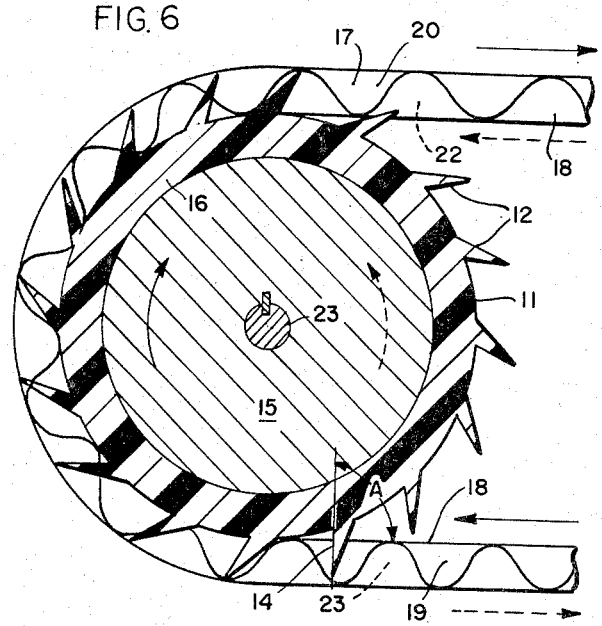
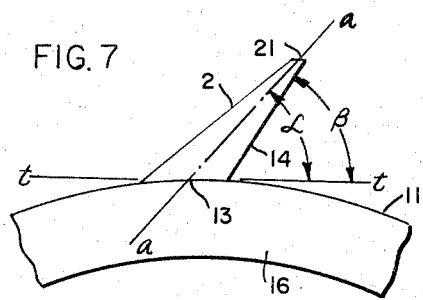
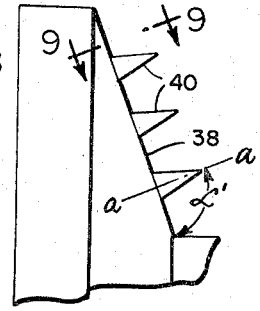
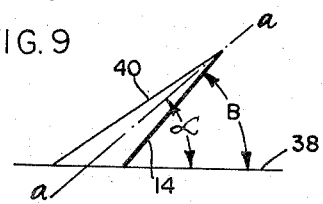
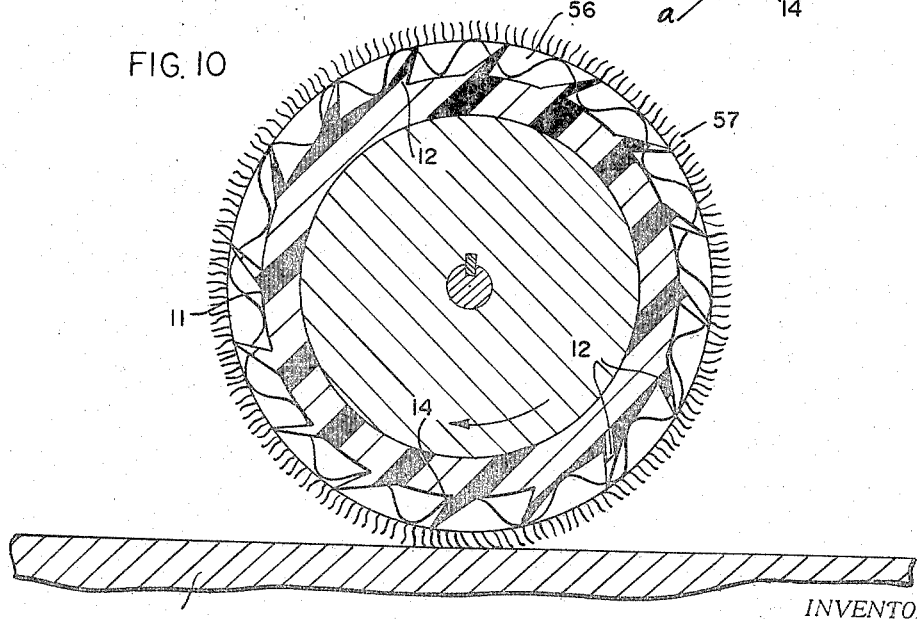
INVENTOR:
ROBERT V. MATHISON
BY
Marzall, Johnston, Cook & Root
ATT'YS

United States Patent Office 3,375,725
Patented Apr. 2, 1968

3,375,725
ROTATABLE CYLINDER AND PULLEY DEVICES
Robert V. Mathison, 5 Woodcrest Road,
Asheville, N.C. 28804
Filed Nov. 22, 1965, Ser. No. 509,066
4 Claims. (Cl. 74—229)

ABSTRACT OF THE DISCLOSURE

Drive and driven cylinders and grooved pulleys having plurality of small, tapered, pointed projections slanting in common, circumferential direction.

---

This invention in general relates to rotatable members having small, sloping, tapered projections. Such projections, for example, can penetrate a continuous, fabric band in driven or driving relationship with the rotatable member. They further can be used to secure a flexible member having a porous back surface on the rotatable member. The rotatable members may be grooved pulleys, adapted to drive or be driven by belts or bands with the projections in the grooves. These rotatable members have in common a plurality of tapered, small, pointed projections on the belt-, band-, or flexible member-contacting face, which projections extend outwardly from said face or faces and are sloped in a common direction relative to the circumference of said face or faces.

The rotatable members of the invention are useful in providing a non-slip surface on the band or belt-contacting face or faces to provide an essentially non-slipping drive between the rotating member and the band or belt. This non-slipping drive is achieved by peneration of the porous face or faces of the band or belt by the projections in a manner in which the penetrated band or belt is gripped securely by the projections while it is in contact with the rotatable member. When the band or belt leaves the cylinder or pulley, the projections readily release themselves from their penetrated relationship with the band or belt.

Another use for the rotatable members of the invention is that of securing thereto a porous-backed member which may be a flat, flexible member which can be laid over a cylindrical surface of the rotatable member with the projections penetrating the porous backing. Such members may be a single layer of cloth or the like, e.g., a heavy felt, in which case the porous backing is an integral part of the flexible member. The flexible member may also be a continuous band having sufficient elasticity or stretchability to fit tightly over the cylindrical surface. Exemplary uses of this aspect of the invention include the securing of fabric covers on paint rollers, fabric buffers, on buffing cylinders, porous-backed sandpaper or like grit sheets on sanding cylinders, and the like.

In the latter uses, the flexible member covers the cylindrical surface. The function of the projections may be one of holding the flexible member on the cylindrical surface in the case of flat members, which are dimensioned so that their edges substantially abut when the flat members are wrapped about the cylindrical surface. In the case of such flat members and also in the case of a band which is slipped over the cylinder, sloping projections function to provide a secure grip of the flexible member on the cylindrical surface of the cylinder.

It is, therefore, an object of the invention to provide improvements in rotatable members through the provision of small, tapered, outwardly extending projections which slope in common circumferential direction from a face or faces of the member.

A further object of the invention is to provide rotatable members of the aforesaid character with projections facilitating the non-slip gripping of the projection-penetrable member secured on, or rotating with, the rotatable member.

Still a further object of the invention is to provide drive or driven pulleys having projections which are orientated on the band or belt-contacting face or faces so that the projections readily enter a projection penetrable belt or band as it rotates with the pulley, provide a non-slip relationship between the contacting face or faces of the pulley and the band or belt, and readily release when the band or belt leaves the pulley.

The invention and its objects and advantages will be more fully appreciated from the following description of preferred embodiments thereof, taken in conjunction with the drawing, wherein:

FIGURE 1 is a front elevation of a cylinder of the invention with outwardly extending, sloping projections covering the cylindrical surface;

FIG. 2 is a same elevation of another embodiment of cylinders of the invention wherein the projections are located adjacent opposite, longitudinal edges of the cylindrical surface and have progressively decreasing length in directions inward from respective longitudinal ends;

FIG. 3 is a top plan view of a V-pulley for use in conjunction with fabric backed V-belts;

FIG. 4 is a top plan view of another pulley embodiment for use in conjunction with braided ropes or bands of substantially cylindrical cross section;

FIG. 5 is a section taken on section plane 5—5 of FIG. 4;

FIG. 6 is a section of a cylinder as illustrated in FIG. 1 or FIG. 2 illustrating the coaction between the projection-containing cylindrical face thereof and a fabric, continuous belt or band, shown in fragment;

FIG. 7 is an enlarged, detailed view of a projection and its relationship with the cylindrical surface of FIG. 6;

FIG. 8 is an enlarged, detailed view of a V-belt-contacting face of a pulley as shown in FIG. 3;

FIG. 9 is an enlarged detailed view of a projection on the V-belt-contacting face of FIG. 8 and is taken on section plane 9—9 of FIG. 8; and FIG. 10 is a cross-section of a cylinder of the invention with a fabric covering secured thereon.

Referring to the drawings, there is shown in FIG. 1 a cylinder 10 having a cylindrical outer face 11 covered by a plurality of small, tapered, pointed projections 12. As shown more particularly in FIG. 6, the projections 12 extend outwardly from the cylindrical face 11 and slant in a common, circumferential direction. Referring to FIG. 7, the longitudinal axes $a$—$a$ of the projections 12 are substantially straight line axes which slope in said common, circumferential direction from the cylindrical surface 11 at an acute angle $\alpha$ in the order of 15–60° relative to the respective tangents $t$—$t$ to the cylindrical surface 11 at the respective intersections 13 of the axes therewith. Also, the undersides 14 of the sloping projections 12 slope in the same common, circumferential direction at an acute angle $\beta$ to the respective tangents $t$—$t$ in the order of 20–70°.

The cylinder 10 may be solid or hollow. In the preferred construction, a cylinder 10 has a solid or open core 15 providing a rotatable support for a base sheet 16. The base sheet may be secured about the core 15 by any suitable means, i.e., by screws, adhesive, metal brazing, etc. The base sheet 16 has on its outer surface 11 the outwardly projecting, sloping projections 12 as aforedescribed. The base sheet 16 may comprise a metal sheet, plastic sheet, or the like. In the case of a plastic sheet the projections 12 may be also plastic and may be integrally formed with the base sheet 16. The projections 12, however, also may be made of metal or other suitable material, e.g., in the form of pins having bases tightly secured in the plastic or metal base sheet 16. In still another form, the base sheet 16 of plastic, metal, or the like, may have the projections 12 struck out.

Use of the cylinder of the invention in driving and driven relationship with a band or strip 17 of fabric or the like is illustrated in FIG. 6. When the cylinder 10 is used to drive the band or strip 17 in the respective directions of the cylinder and the band or strip as shown by the solid arrows, the projections preferably are oriented so that their shortest sides 14 form an angle A in the order of 70 to 110° with respect to the plane of the cylinder-contacting face 18 of the band or strip 17 as the projections sucessively penetrate the fabric interstices through the face 18 on the entrance side of the band or strip. When the cylinder 10 is driving the band or strip 17, the entrance side 19 of the band or strip 17 is under tension. In this tension relationship, the fibers of the band or strip 17 work against the underside 14 of the projections 12 and, because of the acute angle $\beta$, the strip 17 works down the respective under sides until it is in contact with the outer face 11 of the cylinder. Thus, the band or strip 17 remains in tight, non-slipping relationship with the contacting portions of the face 11 of the cylinder 10.

When the band or strip 17 reaches the stage of being discharged from the cylinder 10, i.e., the exit portion 20, the axes $a$—$a$ of the projections and the undersides 14 thereof progressively assume an orientation which is more nearly parallel to the plane of the exit portion 20 of the band. The projections, therefore, easily slip out of the penetrated interstices of the fabric without damaging it.

The sizes of the projections and the intensity thereof per unit area depends, of course, on the character of the material used for the band or strip 17 and also upon the amount of power applied. In order to avoid permanent damage to the band or strip 17, particularly when it is a continuous band which repeatedly comes into contact with the projections 12, the projections 12 are relatively small and also preferably have a larger intensity per unit area.

In the preferred forms, the projections 12 are smooth sided, substantially rigid, closely spaced projections which taper from their bases to relatively sharp tips. They are preferably substantially conical or pyramidal, slightly blunted if desired, and have a center-to-center spacing at their tips in the order of 0.03 to 0.25 per inch. The size of the bases of the projections is preferably at least 0.03 inch in at least one dimension. The vertical heights of the tips of the projections from the surface 11 is preferably in the range of 0.03 to 0.150 inch. The intensity of the projections per unit area of the surface 11 which contains said projections is preferably a range of 100 to 500 per square inch.

As a typical example, the projections can have axes $a$—$a$ of 0.050 inch in length from the base to the tip and can be slanted at an angle $\alpha$ of about 45° with respect to the tangent $t$—$t$. The bases thereof can be about 0.030 inch and can have slightly blunted tips 21 of about 0.01 inch.

When cylinders of the character illustrated in FIGS. 1 and 2 are driven by the band or strip 17, the band or strip 17 and the cylinder 10 can move, for example, in the direction of the dotted arrows shown in FIG. 6. In such case the band or strip 17 is in tension when it is in contact with projections 12 and face 11 in the direction of the rotation of the cylinder 10. At the entrant portion 22 of the band or strip 17, the projections 12 initially lie against the underside 18. As the strip or band 17 progresses about the cylinder 11, this tension causes the projections to seat in the interstices of the fabric of the band or strip 17. The penetrated fibers work against the sloping undersides 14 as a result of this tension, and the fabric band or strip quickly becomes tightly seated on the projections 12 and works downwardly against the outer face 11. At the discharge side 23, the projections readily release from the interstices of the fabric of the band or strip 17 by a relative motion in an upward and forward direction with the shorter sides 14 assuming the angle A of 70–110° when the projections leave the band or strip 17.

Returning to FIG. 1, the cylinder 10 may be rotatably suported by any suitable means, i.e., by a single shaft or by stub shafts 23 projecting from opposite longitudinal ends. In certain instances it is advantageous to provide at respective longitudinal ends of the cylinder 10 disc-like shoulders 24 and 25 having outer edges 26 which project beyond the outer tips of the projections 12. The shoulders 24 and 25 protect the projections against damage in the event the cylinder would be accidentally rolled or rotated in contact with a surface which would cause the tips to be bent or broken.

The embodiment of FIG. 2 is similar in most respects to FIG. 1 and, where applicable, like numerals have been used to designate like parts. The cylinder 30 of FIG. 2 may be constructed in the general form illustrated in FIG. 6. Its primary difference from the cylinder of FIG. 1 is that it has on its cylindrical outer face projections 31 only adjacent opposite longitudinal ends of the cylindrical face 11. Furthermore, the projections 31 have progressively decreasing length from the respective outer edges toward the longitudinal center portion of the face 11. The projections 31, however, are of the same general orientation with respect to the cylindrical surface 11 as is shown in FIG. 7.

Pulleys of the invention are illustrated in FIGS. 3–5, 8 and 9. In FIG. 3, the pulley 35 comprises a metal or plastic body 36 having a circumferential V-groove 37 and a shaft 34. This pulley is of conventional construction, with the exception of the provision on the V-belt-contacting faces 38 and 39 of a plurality of small, outwardly extending sloping projections 40 of the sizes aforesaid. As shown more particularly in FIGS. 8 and 9, the projections 40 are small, tapered, relatively pointed projections extending outwardly from the belt-contacting faces. The axes $a$—$a$ intersect the faces 38 and 39 at an angle $\alpha$ which is the same as the angle $\alpha$ previously described with regard to FIG. 7. The angle of the shortest sides 14 with respect to the faces 38 and 39, similarly, is similar to the angle $\beta$ previously described with respect to FIG. 7, when the projections are viewed as shown in FIG. 9. In front or rear elevations, the axes $a$—$a$ form with the belt-contacting faces 38 and 39 an angle $\alpha'$ which is approximately 90°.

The V-belts used in association with the pulley of FIGS. 3, 8 and 9 is one having a porous, projection penetrable face in contact with the respective pulley faces 38 and 39. A rubber V-belt having a fabric covering on said faces thereof is suitable. The fabric covering provides the projection-penetrable surfaces.

Another embodiment of the pulleys of the invention is illustrated in FIGS. 4 and 5. This pulley 45 comprises a cylindrical body having a circumferential groove 46. The groove 46 has a rounded bottom 47. The pulley 45 has a shaft 48 extending axially therethrough.

The rounded bottom 47 of the groove 45 is provided with a plurality of concentric rows of small, tapered, sloping projections of the character previously described. A first row of projections 49 is located at the bottom of the groove 46. The axes of these projections, as viewed in side elevation, extend outwardly and slope in a common circumferential direction substantially as previously described with respect to projections 12 (see FIG. 7). The shortest sides (undersides) of said projections are also at an acute angle with respect to the tangent as also previously described with respect to projections 12. When viewed in front or rear elevation, the axes of the projections 49 are substantially at right angles to the axis of rotation R—R of the pulley 45.

Two additional concentric rows of projections 50 are provided next to and on opposite sides of the row of projections 49. The axes thereof, when the projections are viewed in side elevation, extend outwardly from and slope in the same circumferential direction as the projections 49. When viewed in front or rear elevation, the axes of the projections are at substantially right angles, at the intersections of the axis with the curve of the curved bottom 47 of groove 46, to the tangents at said intersecions.

Two addiional rows of projections 51 are provided substantially at the intersection of the side walls 52 of groove 46 and the curved, bottom wall 47 thereof. These small, tapered, sloping projections are situated in rows substantially opposite each other on opposite sides of the groove 46. Their axes are such that they slope in the same circumferential direction as the circumferential direction of slope of the other projections. When viewed in front or rear elevation the axes of the projections 51 are substantially at right angles to the sides 52 of groove 46.

The projections 49, 50 and 51 thus form a group of projections adapted to penetrate a substantially cylindrical belt, rope, or the like. In the illustrated embodiment a braided rope 53 extends about half the pulley with the projections 49–51 penetrating the interstices of the braided rope. The pulley of this embodiment may be used as a drive or driven pulley in substantially the same manner as previously described with respect to the use of the cylinder 10. Alternatively, the pulley 45 may be employed to block the rope against movement by precluding slippage over the pulley in a direction opposite to the direction of circumferential slope of the projections 49–51. In this case the pulley 45 could be locked against rotation, i.e., used as a non-rotatable member.

In the latter instance, the pulley of FIGS. 4 and 5 has the advantage that the rope 53 can be slipped over the surface of the groove 46 when it is pulled in the direction of arrow A′ so that the rope slides over the bottom 47 of groove 46 in the same direction as the direction of slope of the projections. On the other hand, when the rope is pulled in the direction of arrow A″, the rope is securely held by the pulley by virtue of the secure seating of the projections in the interstices of the rope.

The projections 49, 50 and 51 may be formed by molding, casting, etc., as an integral part of pulley 45. Also, the base of groove 46 may have a recess 54 to receive a concave ring 55, the ring 55 having the projections on its concave face. In this manner, the projections 49, 50 and 51 can be made separately on base 55, after which the latter is mounted and secured in the recess 54.

The embodiment of FIG. 10 constitutes a cylinder of the same character as the cylinder illustrated in FIGS. 1, 6 and 7, and like numerals have been used to indicate like parts. In the embodiment of FIG. 10, the cylinder is covered with a woven fabric backed, flexible, hollow sleeve. This hollow sleeve comprises the aforesaid fabric backing 56 in which the projections 12 are firmly seated. The outer surface of the fabric back 56 is covered with fibers or yarns 57 when the sleeve is a polishing sleeve. Instead of the fibers or yarns 57 there may be applied on the outer surface of the fabric backing 56 other materials such as abrasives, hair, or wire bristles. The cylinder of FIG. 10 with the sleeve thereon may be used for polishing, buffing, grinding, brushing, sanding, and the like, of a surface of a metal, wood, plastic, or like member 58. The sleeve-covered disc is rotated in the same direction as the direction of circumferential slope of the projections 12 so that the fibers of the fabric layer 56 are worked against the undersides 14 of the projections 12 when the layer 57 is in working contact with the surface of the member 58.

The sleeve may be mounted on or removed from the cylinder 10 by slipping it over one end and applying a relative rotation of the sleeve to the cylinder in the same direction as the direction of circumferential slope of the projections 12 and also working it axially over the cylinder. This provides a motion which would allow the fabric back 56 to slip over the projections 12 until it is fully inserted on the cylinder 10.

Should the backing 56 be a sheet instead of a sleeve, the sheet would be mounted by securing one edge on the projections and progressively wrapping the sheet about the cylinder in a direction opposite to the slope of the projections while applying pulling tension on the sheet as it is wrapped.

The invention is hereby claimed as follows:

1. A pulley comprising a cylindrical body having a groove about the circumference thereof, the walls defining said groove having a plurality of small, tapered projections with pointed tips projecting therefrom into said groove, and said projections sloping in the same circumferential direction.

2. A pulley as claimed in claim 1, wherein said walls defining said groove comprise opposing, spaced side walls and a bottom wall, and said projections being arranged in circumferential rows on said side walls.

3. A pulley as claimed in claim 2, wherein said bottom wall defines a concave, rounded bottom of said groove, and said projections being arranged in circumferential rows on said rounded bottom.

4. A combination comprising a pulley as claimed in claim 3, means rotatably supporting said pulley, and a rope of substantially cylindrical cross-section in said groove with said projections penetrating said rope.

References Cited

UNITED STATES PATENTS

| | | | |
|---|---|---|---|
| 26,707 | 1/1860 | Planer | 74—230.5 |
| 361,573 | 4/1887 | Baville | 74—230.7 |
| 377,161 | 1/1888 | Jebb | 74—230.7 |
| 444,447 | 1/1891 | Lieb | 74—230.5 X |
| 969,438 | 9/1910 | Anderson | 74—230.5 |
| 1,810,636 | 6/1931 | Adler et al. | 74—230.5 X |
| 2,117,195 | 5/1938 | McKerlie | 74—230.5 |
| 2,941,410 | 6/1960 | Ota | 74—229 |

FOREIGN PATENTS

| | | |
|---|---|---|
| 10,566 | 5/1911 | Great Britain. |
| 1,122,573 | 5/1956 | France. |

FRED C. MATTERN, JR., *Primary Examiner.*

J. A. WONG, *Assistant Examiner.*